(12) United States Patent
Ramones et al.

(10) Patent No.: US 10,718,996 B2
(45) Date of Patent: Jul. 21, 2020

(54) MODULAR CAMERA SYSTEM

(71) Applicant: Arlo Technologies, Inc., Carlsbad, CA (US)

(72) Inventors: John Kui Yin Ramones, San Ramon, CA (US); Christopher Vincent Fonzo, Carlsbad, CA (US); Beau Oyler, Walnut Creek, CA (US); Dayne Nathaniel Tanner, Concord, CA (US)

(73) Assignee: Arlo Technologies, Inc., Carlsbad, CA (US)

( * ) Notice: Subject to any disclaimer, the term of this patent is extended or adjusted under 35 U.S.C. 154(b) by 0 days.

(21) Appl. No.: 16/225,625

(22) Filed: Dec. 19, 2018

(65) Prior Publication Data

US 2020/0201144 A1    Jun. 25, 2020

(51) Int. Cl.
| | | |
|---|---|---|
| G03B 17/02 | (2006.01) | |
| G08B 13/196 | (2006.01) | |
| H04B 1/38 | (2015.01) | |
| H04N 5/33 | (2006.01) | |

(52) U.S. Cl.
CPC ....... *G03B 17/02* (2013.01); *G08B 13/19619* (2013.01); *H04B 1/38* (2013.01); *H04N 5/33* (2013.01)

(58) Field of Classification Search
CPC .............................................. G08B 13/19619
See application file for complete search history.

(56) References Cited

U.S. PATENT DOCUMENTS

| | | | |
|---|---|---|---|
| 3,521,216 | A | 7/1970 | Tolegian |
| 3,808,577 | A | 4/1974 | Mathauser |
| 5,812,356 | A | 9/1998 | O'Connor |
| 5,901,367 | A | 5/1999 | Toh |
| 5,941,729 | A | 8/1999 | Sri-Jayantha |
| 6,250,931 | B1 | 6/2001 | Mendelson |
| 6,375,369 | B1 | 4/2002 | Schneider et al. |
| 6,402,031 | B1 | 6/2002 | Hall |
| 6,449,431 | B1 | 9/2002 | Cuddeback et al. |
| 6,607,391 | B2 | 8/2003 | Mendelson et al. |
| 7,311,526 | B2 * | 12/2007 | Rohrbach .......... H01R 13/6205 439/39 |
| 7,327,396 | B2 | 2/2008 | Schultz et al. |
| 7,517,222 | B2 | 4/2009 | Rohrbach et al. |
| 7,641,477 | B2 | 1/2010 | DiFonzo et al. |
| 7,645,143 | B2 | 1/2010 | Rohrbach et al. |
| 7,901,216 | B2 | 3/2011 | Rohrbach et al. |
| 8,087,939 | B2 | 1/2012 | Rohrbach et al. |
| 8,177,560 | B2 | 5/2012 | Rohrbach et al. |

(Continued)

FOREIGN PATENT DOCUMENTS

| | | |
|---|---|---|
| CN | 202979112 U | 6/2013 |
| CN | 203840440 U | 9/2014 |

*Primary Examiner* — Clayton E. LaBalle
*Assistant Examiner* — Leon W Rhodes, Jr.
(74) *Attorney, Agent, or Firm* — Boyle Fredrickson S.C.

(57) ABSTRACT

An electrical pathway is formed between a receiving port located on an outer surface of the casing and the electronic device module received therein, such that a power supply may pass from a power connector that is magnetically attached to the port, to the electronic device module via the intermediate casing. The casing and electronic device modules further cooperate to form a module separation assembly that may be activated to remove or eject the electronic device module from within the casing.

20 Claims, 9 Drawing Sheets

(56) References Cited

U.S. PATENT DOCUMENTS

| | | |
|---|---|---|
| 8,345,429 B2 | 1/2013 | Kim et al. |
| 8,388,353 B2 | 3/2013 | Kiani et al. |
| 8,414,201 B2 | 4/2013 | Skeoch et al. |
| 8,435,042 B2 | 5/2013 | Rohrbach et al. |
| 8,497,657 B2 | 7/2013 | Franks et al. |
| 8,525,880 B2 | 9/2013 | DiPoala |
| 8,535,088 B2 | 9/2013 | Gao et al. |
| 8,596,881 B2 | 12/2013 | Umeno |
| 8,622,629 B1 | 1/2014 | Umeno |
| 8,690,582 B2 | 4/2014 | Rohrbach et al. |
| 8,900,009 B2 | 12/2014 | Hornick et al. |
| 8,970,332 B2 | 3/2015 | DiFonzo et al. |
| 9,112,304 B2 | 8/2015 | Rohrbach et al. |
| D741,931 S | 10/2015 | Huang et al. |
| 9,281,612 B2 | 3/2016 | Gao et al. |
| 9,426,339 B2 | 8/2016 | Pacurariu et al. |
| 9,485,477 B2 | 11/2016 | DiPoala |
| 9,576,466 B2 | 2/2017 | Sager et al. |
| D790,620 S | 6/2017 | Lee et al. |
| 9,930,227 B2 | 3/2018 | Pfiffi |
| 9,930,257 B2 * | 3/2018 | Blum .................... H02J 50/80 |
| 2004/0048507 A1 | 3/2004 | Hage |
| 2004/0145341 A1 * | 7/2004 | Fukushima .......... H01M 2/1022 |
| | | 320/107 |
| 2005/0247845 A1 | 11/2005 | Li et al. |
| 2006/0115265 A1 | 6/2006 | Elberbaum |
| 2007/0126871 A1 | 6/2007 | Henninger, III et al. |
| 2008/0239141 A1 | 10/2008 | Yang |
| 2009/0196597 A1 | 8/2009 | Messinger et al. |
| 2010/0034530 A1 | 2/2010 | Son |
| 2010/0165188 A1 | 7/2010 | Jannard |
| 2013/0223833 A1 | 8/2013 | Tenenbaum et al. |
| 2014/0313032 A1 | 10/2014 | Sager et al. |
| 2014/0375874 A1 | 12/2014 | Asano |
| 2015/0195442 A1 * | 7/2015 | Pacurariu .......... H04N 5/23203 |
| | | 348/211.2 |
| 2016/0125318 A1 | 5/2016 | Scoffier et al. |
| 2016/0125714 A1 | 5/2016 | Kates et al. |
| 2016/0167593 A1 | 6/2016 | Dry et al. |
| 2017/0109586 A1 | 4/2017 | Rana et al. |
| 2017/0186309 A1 | 6/2017 | Sager et al. |
| 2017/0353656 A1 * | 12/2017 | Ramones ........... H04N 5/2256 |
| 2018/0007245 A1 * | 1/2018 | Rantala ................. G03B 37/04 |
| 2018/0109704 A1 * | 4/2018 | Gilbert ................ H04N 5/2253 |

\* cited by examiner

MODULAR CAMERA SYSTEM

BACKGROUND OF THE INVENTION

1. Field of the Invention

The invention relates generally to a modular electronic device system such as a camera, and more particularly, relates to a modular electronic device system having a removable outer casing that may provide mounting surfaces for the system and pass through electrical connection between the electronic device disposed within the casing and a power supply. The invention additionally relates to a method of using the same.

2. Discussion of the Related Art

As the market for small electronic devices such as cameras and floodlights has continued to expand, the availability and accessibility of such devices has similarly experienced growth. The camera industry, for example, has experienced significant expansion as a result of the improvement of digital photography, and the introduction of high-quality digital image sensors into a growing field of small electronic devices, such as webcams, wireless network compatible cameras, handheld camcorders, action cameras, etc. These various cameras have become increasingly commonplace, largely driven by their flexibility, low-cost, and general ease of use.

For example, wireless network compatible cameras often are used for a variety of purposes including home security, business security, child monitoring, pet monitoring, etc. Additionally, many of these cameras offer beneficial features such as night vision through the use of infrared LEDs, high definition widescreen video, digital zoom, motion detection, audio alerts, etc.

Despite the many various uses for these small electronic devices, such as wireless network compatible cameras, additional specialized features beyond those provided by a dedicated camera are becoming increasingly desirable. For example, dedicated wireless network compatible motion sensors, flood lights, infrared flood lights, audio sirens, speakers, etc. may each provide additional benefits to users beyond or in addition to those provided by dedicated wireless network compatible cameras. For example, an additional motion sensor may be used in combination with a wireless network compatible camera to activate the camera based upon motion that has not yet entered the field of view of the camera. Alternatively, a wireless network compatible flood light may be activated upon activation of a discrete wireless network compatible camera or motion sensor.

However, despite the ability to utilize multiple small electronic devices on a wireless network, there exists the need to easily switch between, adjust, and modify the various components that may be utilized within a networked system.

Additionally, there exists a need to permit the replacement of a single small electronic device in the system without having to replace or reinstall related peripheral accessories, such as mounting devices and/or power supplies.

Still further, there is a desire for various small electronic devices to provide a uniform aesthetic appearance while maintaining their interchangeability.

Thus, there is need and desire to provide a modular electronic device system that having a removable outer casing or case that may provide mounting of the system, independent of the electronic device contained within the casing. There is also a need and desire to provide a modular electronic device system having a removable outer casing that includes a pass-through electrical connection between the electronic device disposed within the casing and an external power supply.

Furthermore, it may be desirable to provide a modular electronic device system that may facilitate multiple sizes of wireless network compatible small electronic devices within a removable outer casing. For example, a removable outer casing that is configured to receive both a wireless camera with a standard capacity battery and a physically larger extended capacity battery is desired while maintaining the modular outer casing's ability to provide magnetic mounting of the system and pass-through electrical connection.

Also, a method of using a modular electronic device system that exhibits an outer casing providing both secure mounting, ease of module separation, and pass-through electrical connection also is desired.

SUMMARY OF THE INVENTION

One or more of the above-identified needs are met by a modular electronic device system for use with a wireless network, having a casing and a wireless network connected electronic device module configured to be received within the casing. The casing may include a series of contiguous walls, an interior void defined by inner surfaces of the walls, and an opening providing access to the interior void. The wireless network connected electronic device module may include an outer housing releasably received within the interior void of the casing, a front surface visible through the opening when the electronic device module is received within the interior void, and an electronic component located at the front surface. An electrical pathway extends from a port at an outer surface of the casing to the electronic device module. Removal of the electronic device module from the casing is achieved via a module separation assembly having a button that extends through a wall of the casing and that is configured to displace a latch movably located within the outer housing of the electronic device module.

In accordance with another aspect of the invention, the wireless network connected electronic device module may include a camera, motion sensor, flood light, IR flood light, siren, speaker, or a combination thereof.

In one embodiment, an outer housing of the wireless network connected electronic device module comprises a body and a removable portion providing access to a battery receiving void disposed within the body.

In one embodiment, the module separation assembly includes a first compression spring exerting a return force on a latch to maintain frictional engagement between the latch and a catch, and a second compression spring configured to exert a separating force on the module when the latch is disengaged.

In one embodiment, the power connector and/or port comprise a magnet configured to magnetically retain the power connector in electrical communication with the port.

In one embodiment, a rear wall of the casing comprises at least one magnetic mount engaging location configured to magnetically affix the system to a mount.

In one embodiment, the rear wall of the casing has a generally centrally located threaded recess for mating with a mount having a threaded shaft.

In accordance with another aspect of the invention a method of separating modules of the modular electronic device system is provided, including the steps of first exerting a pushing force on a push button extending through the wall of the casing, wherein the pushing force is translated to an outer surface of a pivot plate disposed within the surface of the electronic device module sufficient to overcome a return spring force exerted on the opposing inner surface of the pivot plate by a first compression spring. Then, displacing the pivot plate partially in a direction of the pushing force to release a frictional engagement between a shoulder or latch extending from the outer surface of the pivot plate and a catch extending inwardly from an inner surface of the wall. Upon displacement of the pivot plate and release of the catch, the method further entails exerting a module separation force on a location of an inner surface of the casing that is generally opposite the opening with a second compression spring positioned generally perpendicular to the first compression spring within electronic device module, in order to separate the electronic device module from interior void of the casing.

These and other objects, advantages, and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings, in which like reference numerals represent like parts throughout, and in which.

DETAILED DESCRIPTION OF THE PREFERRED EMBODIMENTS

A wide variety of electronic devices could be used with a mounting device in accordance with the invention as defined by the claims. Hence, while the preferred embodiments of the invention will now be described with reference to a modular battery-powered camera for use with a wireless monitoring network, it should be understood that the invention is in no way so limited and other electronic device, such as motion sensors, flood lights, audio sirens, speakers, wired cameras, and others may be used with a modular system in accordance with the invention as defined by the claims.

Figure 1:
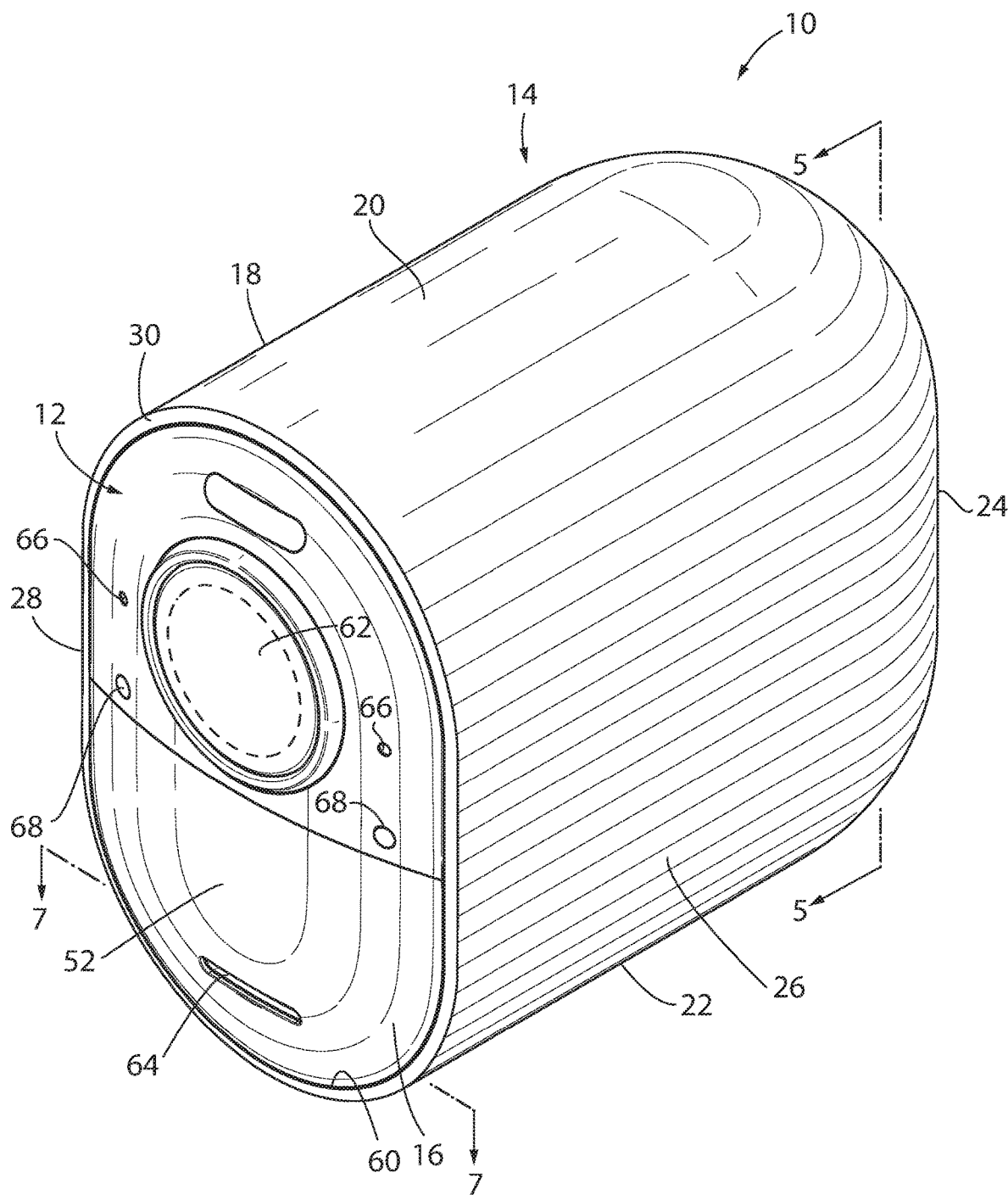
FIG. 1 is a front, top, right-side isometric view of a modular electronic device system constructed in accordance with an embodiment of the present invention, in which a wireless camera module is seated within an outer casing.

FIG. 1 is an isometric view of a modular electronic device system, i.e., modular system 10 constructed in accordance with one embodiment of the present invention. As shown in FIGS. 1-9, and specifically FIG. 1, the modular system 10, when assembled, may include an electronic device module 12 disposed within a removable outer casing 14. While FIGS. 1-9 show the electronic device module 12 as a battery-powered camera 16 for use with a wireless monitoring network (not shown) as one non-limiting embodiment, it should be well understood that the present invention is not so limited, and that alternative electronic device modules 12 are configured to be interchangeably received within the removable outer casing 14 of modular system 10. By way of example, the interchangeable electronic device modules 12 as shown in FIG. 9 may include a camera (a specific example of which is shown at 16 in the remaining views), a flood light, or a speaker, which are each configured to be interchangeably received within the casing 14 of modular system 10. However, it should be understood that the interchangeable electronic device modules are not so limited and may also include motion sensors, infrared flood lights, motion activated flood lights, audio sirens, wired cameras, etc. In one embodiment of the present invention, the modular system 10 has a length of between approximately 50 mm and 120 mm, and more typically of approximately 85 mm, a height of between approximately 50 mm and 110 mm, and more typically of approximately 75 mm, and a width of between approximately 25 mm and 75 mm, and more typically of approximately 50 mm.

Referring now to FIGS. 1-4, the casing 14 includes an outer surface 18, including a top 20, bottom 22, rear 24, and opposing first and second sides 26, 28. The forward-most portion of the top 20, bottom 22, first side 26 and second side 28 form an uninterrupted edge 30 of the forward most portion of the casing 14, that is generally opposite the rear 24 of the casing 14. The edge 30 defines the circumference of an opening 32 disposed within the front of the casing 14 through which the camera 16 or other electronic device 12 is inserted and received within an interior void 34 defined by an inner surface 35 of the casing 14 when the modular system 10 is assembled as shown in FIG. 1.

Figure 4:
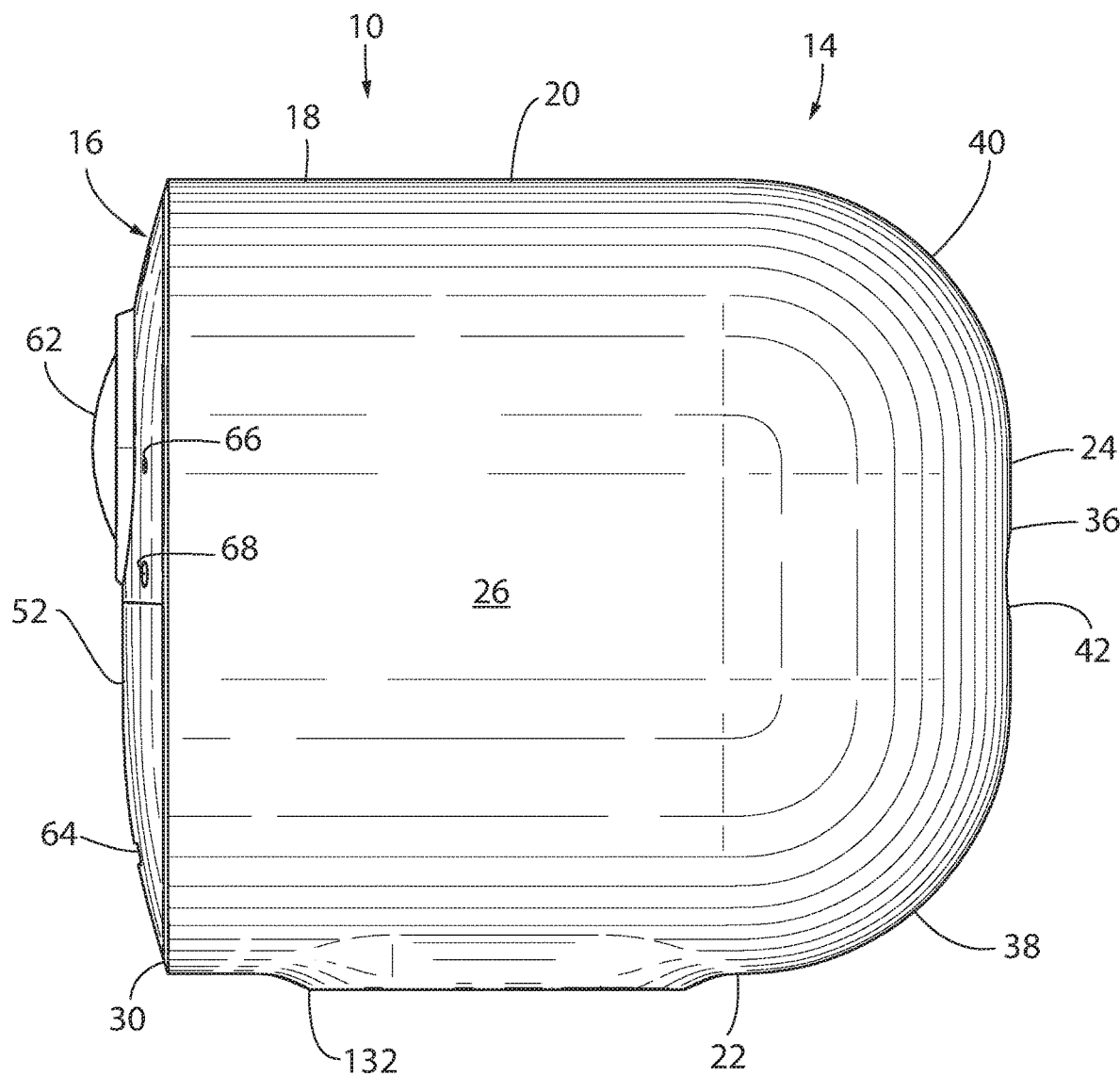
FIG. 4 is a right-side elevation view of the modular electronic device system of FIG. 1.

Referring briefly to the side elevation view of the modular system 10 in FIG. 4, the rear 24 of the casing 14 further includes a generally planar portion 36 that is centrally positioned about a central longitudinal axis of the modular system 10, and approximately equidistance from the top 20 and bottom 22. A bottom or first curved portion 38 of the rear 24 of the casing 14 is positioned generally between the planer portion 36 and the bottom 22 of the casing 14, while an opposing top or second curved portion 40 of the rear 24 is positioned generally between the planer portion 36 and the top 20 of the casing 14. Both curved portions 38, 40 form magnetic mount engaging locations in this exemplary embodiment, with it being understood that other magnetic mount engaging locations, could be provided instead of or in additional to these mount engaging locations.

Figure 5:
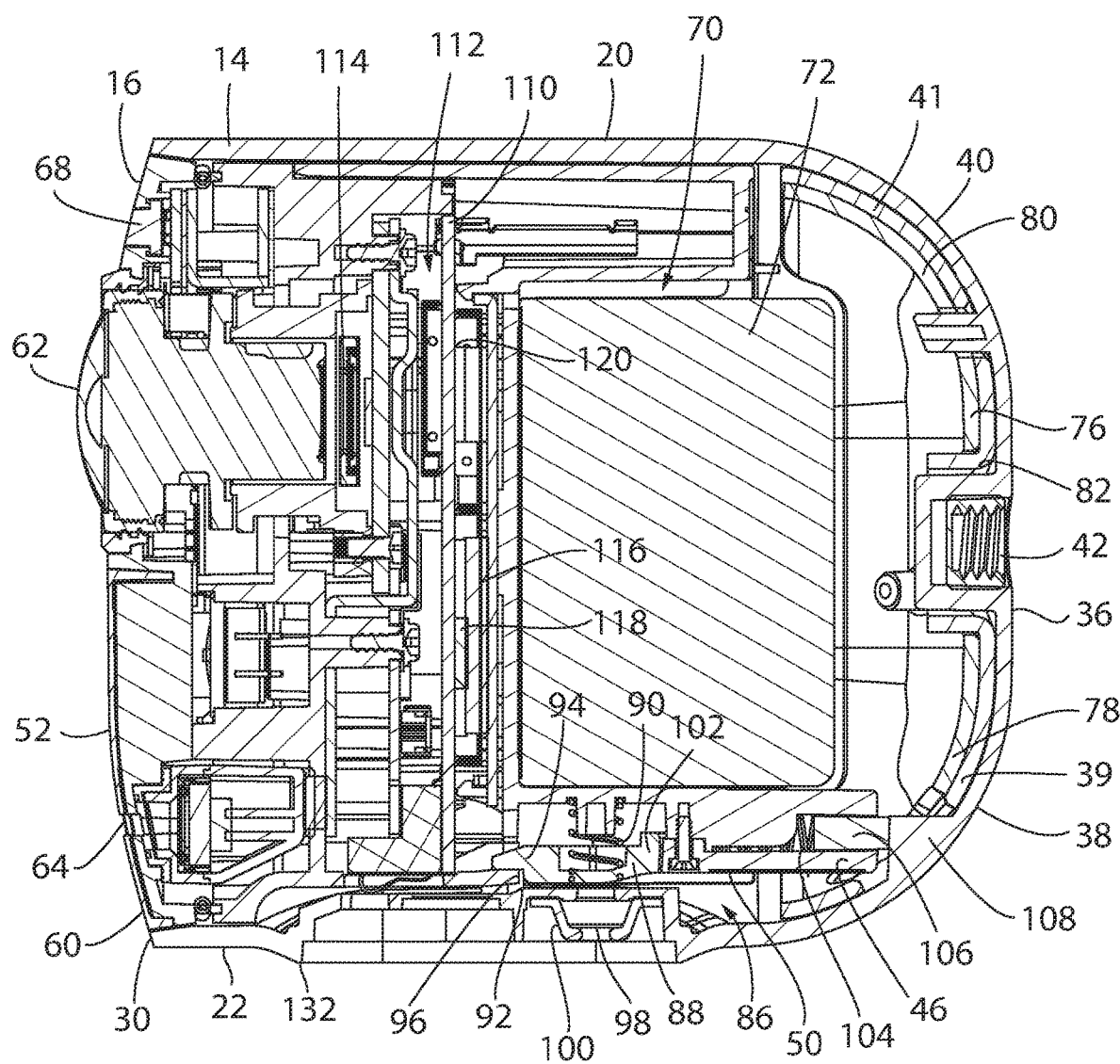
FIG. 5 is a cross-sectional view of the modular electronic device system of FIG. 1, about line 5-5 in FIG. 1.

In forming magnetic mount engagement locations, a ferromagnetic material is disposed adjacent the curved portions 38, 40 of the casing 14, such that the modular system 10 may be supported by a mount device (not shown) exerting a magnetic force of the casing 14. More specifically, the casing 14 further includes a first ferromagnetic body 39 positioned adjacent the first curved portion 38 and a second ferromagnetic body 41 positioned adjacent the second curved portions 40, as shown in FIG. 5. The ferromagnetic bodies 39, 41 may be metal or metal alloy plates that are curved to lie within the inner surface 35 of the casing 14 at their respective first and second curved portions 38, 40 of the rear 24 of the casing 14. Alternatively, the ferromagnetic bodies 39, 41 may each be formed of multiple discrete metallic portions disposed over all or a substantial portion (typically in excess of 50% and more typically in excess of 75%) of the area of the first and second curved portions 38, 40, which in combination function as ferromagnetic bodies 39, 41, respectively. The ferromagnetic bodies 39, 41 may be adhesively affixed to the inner surface 35 of the casing 14 at their respective first and second curved portions 38, 40 of the rear 24 of the casing 14. Alternatively, fasteners, such as threaded fasteners may extend through the ferromagnetic bodies 39, 41 and into the casing 14 at their respective first and second curved portions 38, 40, to securely affix the ferromagnetic bodies 39, 41 to the inner surface 35 of the casing 14.

As shown in FIGS. 1-4, the first and second curved portions 38, 40 each have an arc angle of approximately 90 degrees in both a longitudinal and latitudinal plane, such that the first and second curved portions 38, 40 each form a rounded bullnose transition between the planer portion 36 of the rear 24 and the corresponding top and bottom 20, 22 respectively. That is to say that the first and second curved portions 38, 40 are each generally quarter-spherical.

Additionally, another mount engaging location 42 may be disposed within the generally planar portion 36 of the rear 24 of the casing 14. As opposed to engaging a magnetic mount, the mount engaging location 42 may include a threaded recess 44 disposed below the outer surface 18 of the rear 24 of the casing 14. The threaded recess 44, as shown in FIG. 5, may be configured to receive a corresponding threaded shaft (not shown) of a screw-on type mount.

Returning now to FIGS. 1-3, the camera 16 is shown as being configured to be received within the interior void 34 of the casing 14. The camera 16 includes an outer housing 46 having a general shape and size configured to generally match those of the inner surface 35 of the casing 14, which defines the interior void 34. The camera 16 thus is designed to at least substantially fill at the interior void 34 of the casing 14. Alternative electronic device modules 12 of the modular system 10 are configured to similarly have an outer housing which correspond in size and shape to that of the outer housing 46 of the camera 16. More specifically, the outer housing 46 includes a top 48, bottom 50 front 52, rear 54, and opposing first and second sides 56, 58. The front 52 of the camera 16 is defined by an outer edge 60 that is configured to mate or generally align with the front edge 30 of the casing 14, when the modular system 10 is assembled as shown in FIG. 1. While the outer edge 60 of the camera 16 and the front edge 30 of the casing 14 are shown to be generally ovoid in shape, it should be understood that the present invention is not so limited and that any alternative shape or configuration is well within the scope of the current invention. The front 52 of the camera 16 generally defines an exposed functional surface of the camera 16 or alternative modular electronic devise 12, and may include one or more functional components, i.e., light, speaker, microphone, image sensors, etc., extending therefrom.

A lens 62 extends from the front 52 of the camera housing 46, along with a speaker outlet 64, microphone inlets 66, and one or more LEDs 68. The LEDs may be configured to emit IR energy in the range of 700 nm to 1 mm at to allow for an IR sensitive image sensor 114 (described below) to generate video imaging in low light conditions. Each of the lens 62, speaker outlet 64, microphone inlets 66, and LEDs 68 are directed generally forward facing from the front 52 of the camera 16, and opposite the portions 38, 40, 36 of the rear 24 of the casing 14 that may be utilized for mounting the modular system 10. In this configuration the lens 62, speaker outlet 64, microphone inlets 66, and LEDs 68 are directed generally opposite the mount (not shown) which may be affixed to the rear 24 of the casing 14.

Figure 2:
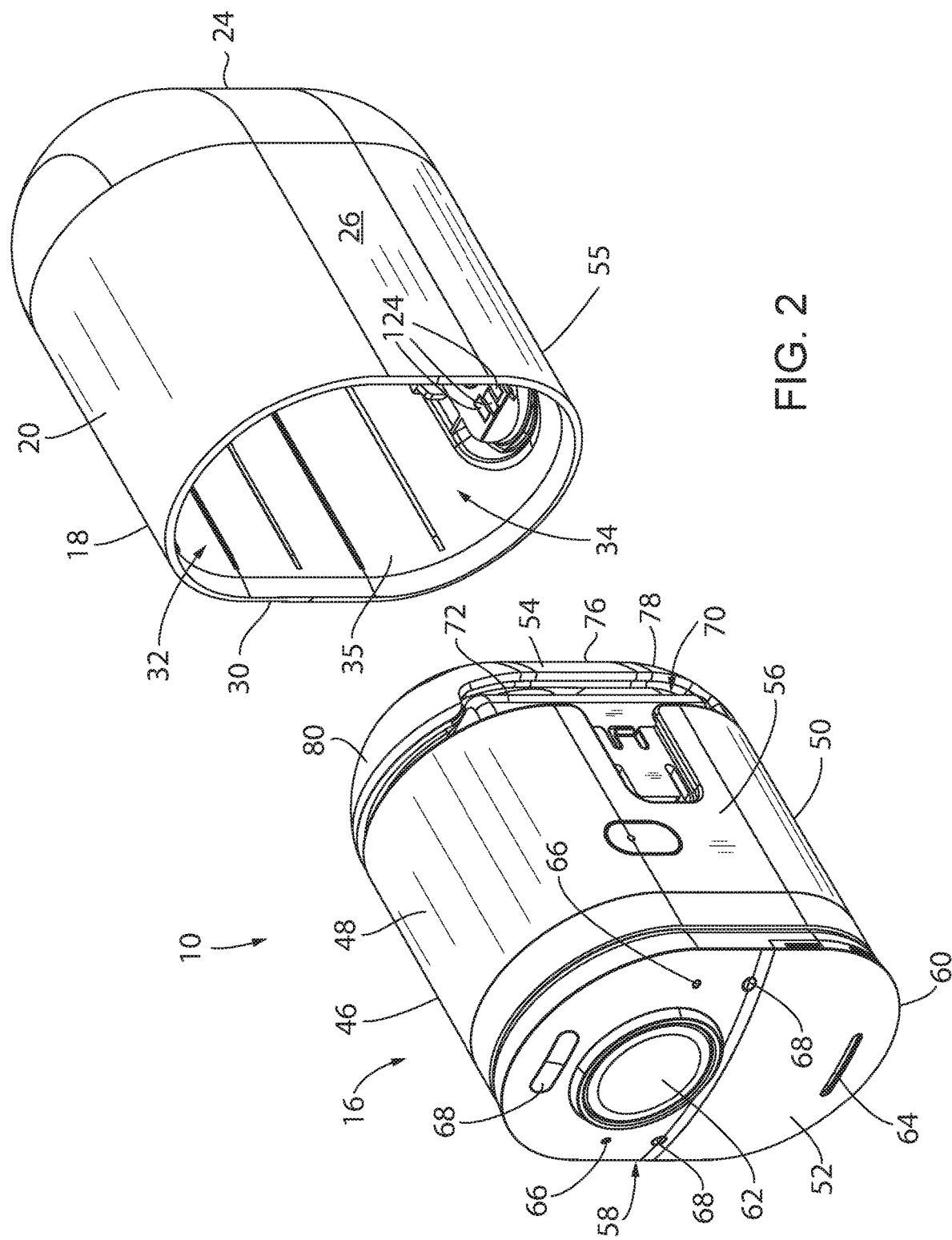
FIG. 2 is a partially exploded front, top, right-side isometric view of the modular electronic device system of FIG. 1, shown along a longitudinal axis of the system, in which the wireless camera module is removed from the outer casing.
Figure 3:
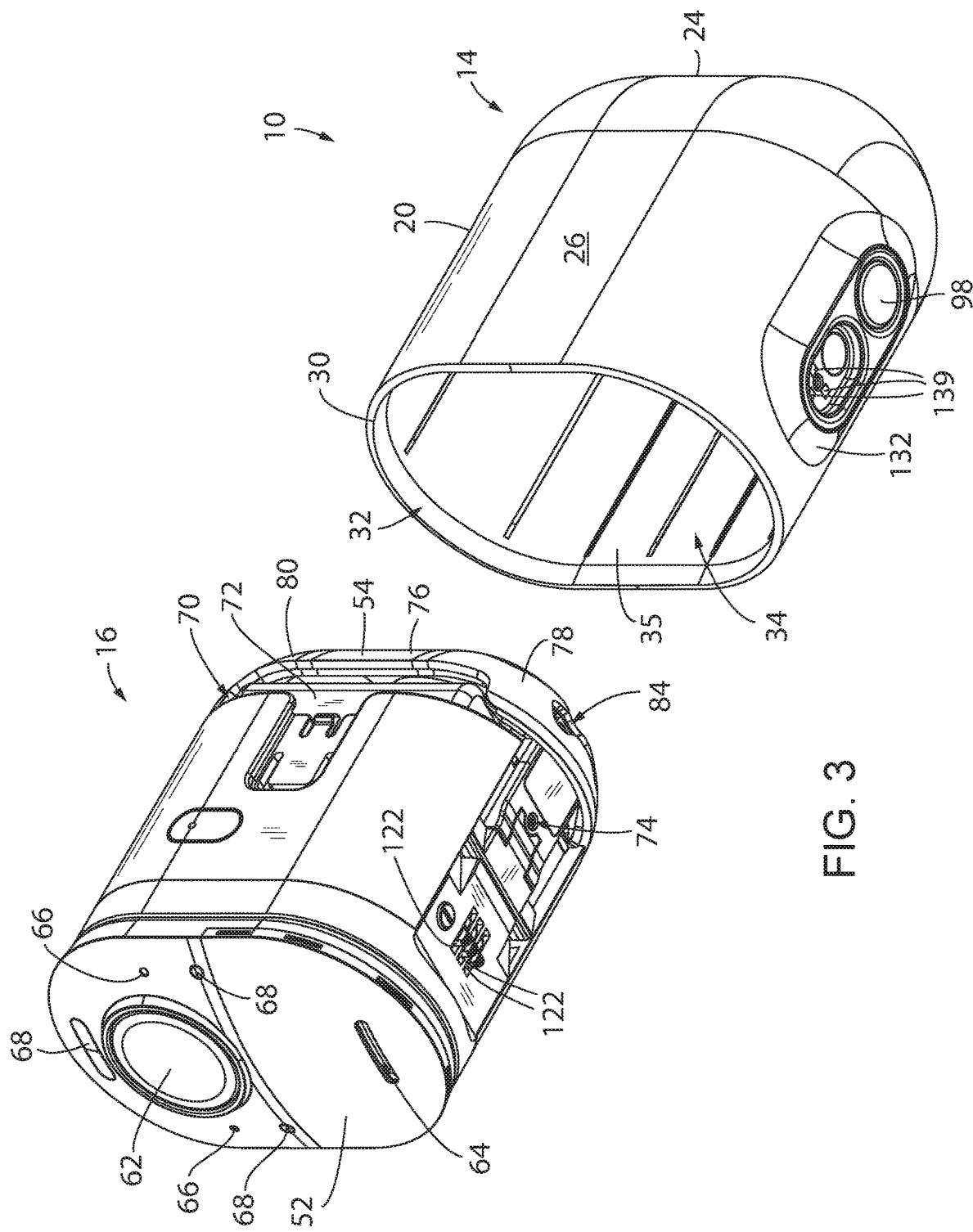
FIG. 3 is a partially exploded front, bottom, right-side isometric view of the modular electronic device system of FIG. 1, shown along a longitudinal axis of the system, in which the wireless camera module is removed from the outer casing.

As shown in FIGS. 2 and 3, the rear 54 of the outer housing 46 may formed of component that is independent from the remainder of the outer housing 46 of the camera 16. That is to say, that top 48, bottom 50, front 52, and opposing first and second sides 56, 58 may be contiguously or integrally formed with one another, and separate from the removable rear 54 component. In this configuration, a battery receiving void 70 may be formed within an interior of the outer housing 46 of the camera 16. The battery receiving void 70 is generally accessed rearwardly of the top 48, bottom 50, and opposing first and second sides 56, 58 of the camera 16. A battery 72 is configured to be disposed within the battery receiving void 70 of the camera 16 and secured therein by the subsequent placement of the rear 54 component onto the camera 16. A fastener such as a threaded fastener 74, which in one embodiment extends through the bottom edge of the rear 54, as shown in FIG. 3, may then securely affix the rear 54 of the camera 16 to the remainder of the outer housing 46, thereby retaining the battery 72 in the battery receiving void 70.

Still referring to FIGS. 2 and 3, the rear 54 of the outer housing 46 of the camera 16 is generally shaped to confirm to the corresponding shape of the rear 24 of the casing 14, into which the camera 16 is received. That is to say, much like the rear 24 of the casing 14, the rear 54 of the housing 46 of the camera 16 similarly includes a generally planar portion 76 that is centrally positioned about a longitudinal axis of the modular system 10, and approximately equidistance from the top 48 and bottom 50. A bottom or first curved portion 78 of the rear 54 of the camera 16 is positioned generally between the planer portion 76 and the bottom 50 of the outer housing 46, while an opposing top or second curved portion 80 of the rear 54 is positioned generally between the planer portion 76 and the top 48 of the outer housing 46.

Turning briefly to the cross-sectional view of FIG. 5, the generally centrally located planner portion 76 of the rear 54 may include a recess or aperture 82 through which the threaded recess 44 of mount engaging location 42 disposed below the generally planar portion 3 of the rear 24 of the casing 14 may extend, when assembled. Additionally, the bottom or first curved portion 78 of the rear 54 of the camera 16 housing 46 may include a void 84 (shown in FIG. 3) configured to facilitate ejection of the camera 16 from the casing 14 as will be described below in further detail.

Figure 6:
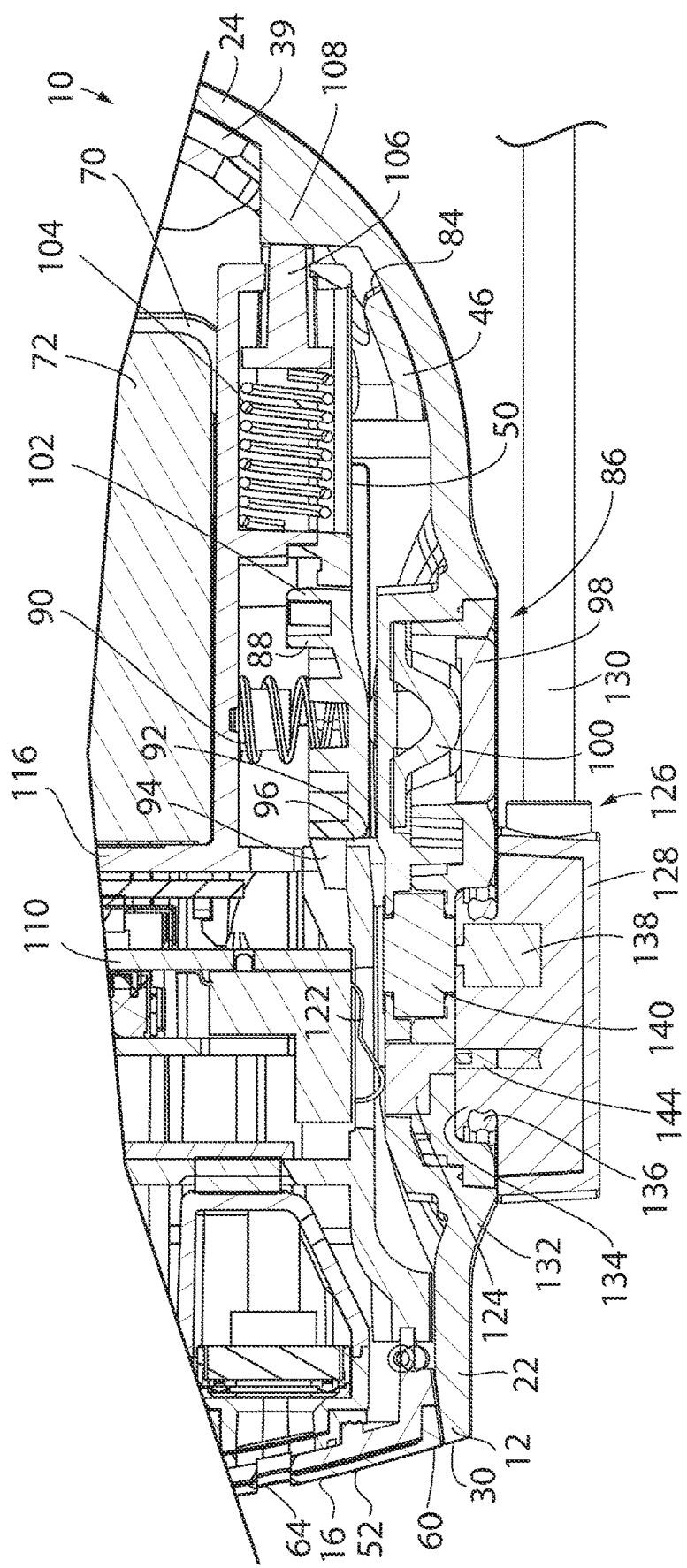
FIG. 6 is a detailed sagittal plane cross-sectional view of the modular electronic device system of FIG. 1 with the magnetic power connector magnetically affixed to the bottom surface of the outer casing.
Figure 7:
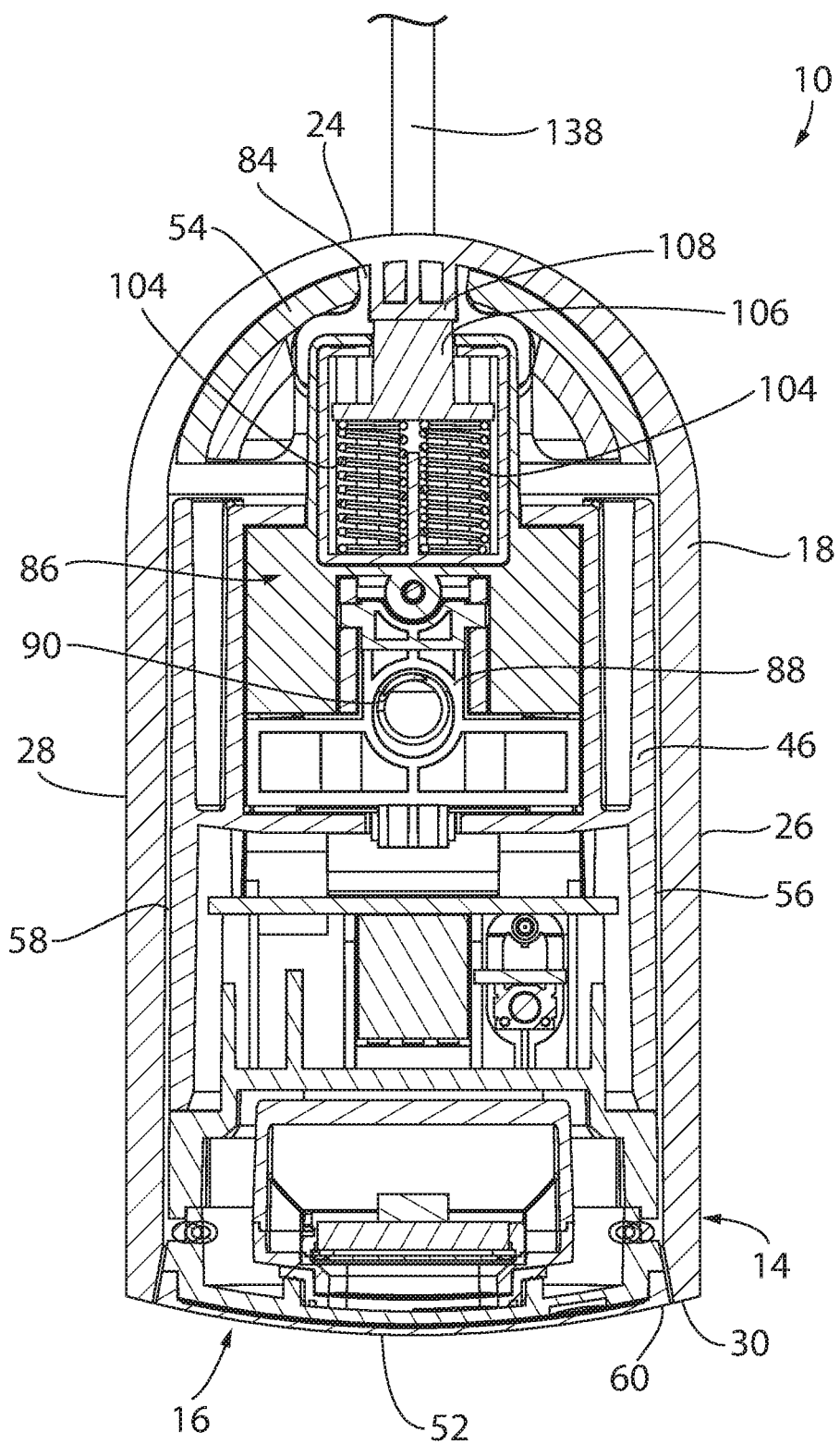
FIG. 7 is a detailed transverse plane cross-sectional view about line 7-7 of the modular electronic device system of FIG. 1 with the power connector magnetically affixed to a port at the bottom surface of the outer casing.

Still referring in part to FIG. 5 as well as the detail view of FIG. 6, a module separation assembly 86 is shown disposed along the base of the camera 16, adjacent the bottom 50 of the housing 46. The module separation assembly 86 includes a pivot plate 88 disposed within the surface of the bottom 50 of the outer housing 46. A compression spring, i.e., return spring 90, passively exerts a generally downward force onto the interior surface of the pivot plate 88 to maintain the plate 88 in a downward position in the absence of an applied opposing force thereon. When the camera 16 is received within the casing 14, a downwardly extending latch or shoulder 92 disposed along a front end 94 of the pivot plate 88 engages with a catch 96 extending upwardly from the inner surface 35 of the casing 14. Frictional engagement between the shoulder 92 and catch 96 restricts movement of the camera 16 within the interior void 34 of the casing 14. An actuator, such as a depressible push button 98 is disposed within the bottom 22 of the casing 14 at a position that overlies the pivot plate 88, and is surrounded by an elastomeric seal 100, which provides both a water seal and a resilient return force to the button 98. During use of the modular system 10, when removal of the camera 16 from the casing 14 is desired, the button 98 is depressed, such that it travels upwardly towards the top 20 of the casing 14. Upward movement of the button 98 is translated to the outer surface of the pivot plate 88, which pivots about its front end 94, while its opposing rear end 102 is raised upwardly towards the top 20 of the casing 14, i.e., partially in the direction of the force applied to the button 98. When the applied force is of sufficient magnitude to overcome the opposing spring force of the return spring 90, this pivoting of the pivot plate 88 disengages the shoulder 92 from the catch 96. One or more ejection compression spring 104, which lie generally perpendicular to the return spring 90 and is located rearwardly of the pivot plate 88, which is kept in a state of compression when the camera 16 is disposed within the casing 14, resultantly expands upon pivoting of the movement of the pivot plate 88. The expanding ejection compression spring 104 forces a linearly slidable spring seat 106 to exert a forwardly-directed pushing force on a block 108 extending inwardly from the inner surface 35 of the casing 14 adjacent the void 84 in the first curved portion 78 of the rear 54 of the camera 16 housing 46. In the absence of the shoulder 92 engaging the catch 96, the rearwardly directed pushing force of the ejection compression spring 104 drives the camera 16 forward towards the opening 32 in the casing 14, thereby ejecting the camera 16 from the casing 14. In one embodiment of the present invention, the ejection compression spring 104 has a spring constant of approximately between 2.5 N/mm and 5.5 N/mm and more typically of 4.25 N/mm. Similarly, in one embodiment of the present invention the pivot plate return spring 90 has a spring constant of approximately between 0.5 N/mm and 3.5 N/mm and more typically of 1.37 N/mm.

While the preceding discussion of the module separation assembly 86 is described in the context of the camera 16 it should be fully understood that the module separation assembly 86 is equally applicable to alternative electronic device modules 12 that are configured to be interchangeably received within the removable outer casing 14 within the modular system 10.

Still referring in part to the cross-sectional view of FIG. 5, the remaining portions of the camera 16 is shown in further detail, including one or more printed circuit boards 110 having the various electrical components 112 of the camera 16 integrated therein, such as an image sensor 114, central processing unit ("CPU") 116, memory 118, wireless network antenna 120. The battery 72, as was described previously is provided in electrical connection with the components 112 of the camera 16, such that the camera 16 may function as a wireless camera with a self-contained rechargeable power supply. However, the modular system 10 is further configured to receive a power supply current via a magnetically attached power connector that affixes to a port at the bottom 22 of the casing 14 and passes electrical current through the casing 14 and into the camera 16, or alternative module 12. As shown in FIG. 3, the bottom 50 of the camera 16 housing 46 includes a series of three linearly arranged electrical contacts 120 extending downwardly from the surface of the outer housing 46. As shown in FIG. 2, the inner surface 35 of the bottom 22 of the casing 14 includes three corresponding electrical contacts 124. The electrical contacts 124 extend through the width of the casing 14, such that when the camera 16 is received within the casing 14, the camera contacts 120 engage the interior surface of casing contacts 124. The opposing exterior surfaces of contacts 124 in the casing 14 are configured to form an electrical connection with the magnetically attached power connector 126, as will be described in further detail below.

Figure 8:
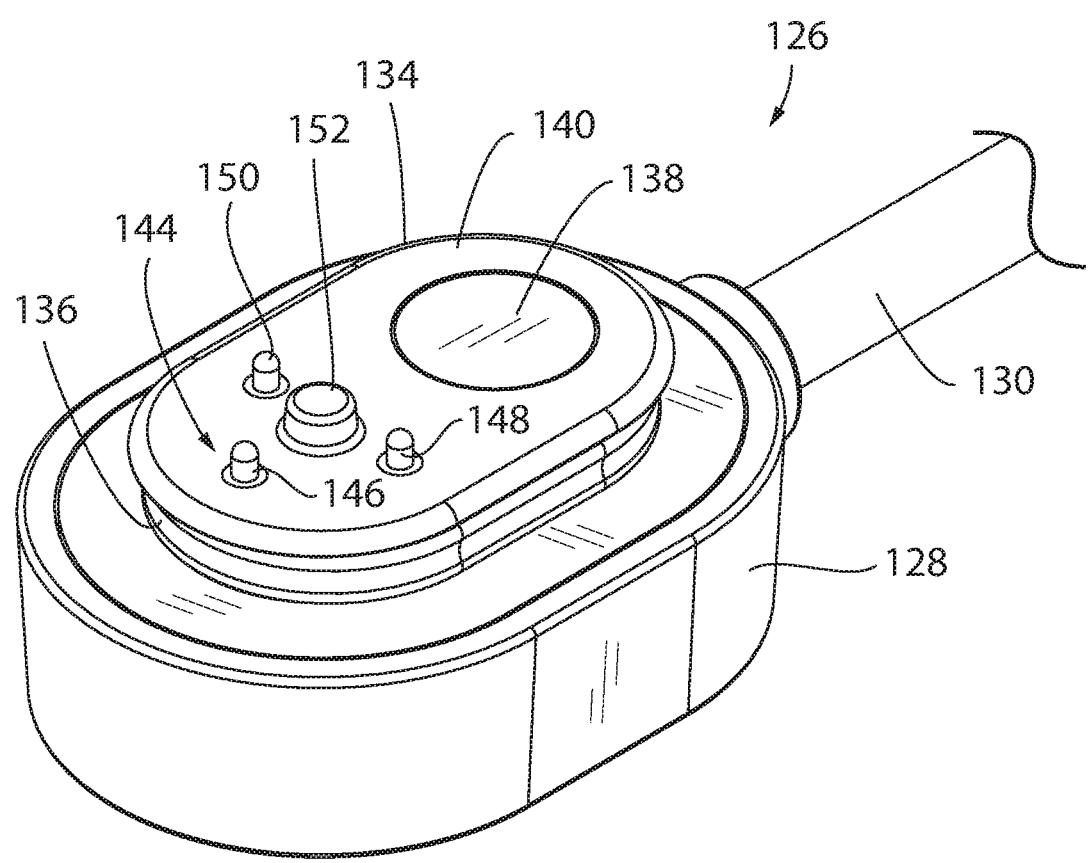
FIG. 8 is a front, top, left-side isometric view of a magnetic power connector configured to engage the outer casing in one embodiment of the present invention; and, FIG. 9 is a block diagram of the modular electronic device system of FIG. 1 with multiple interchangeable electronic device modules.
Figure 9:
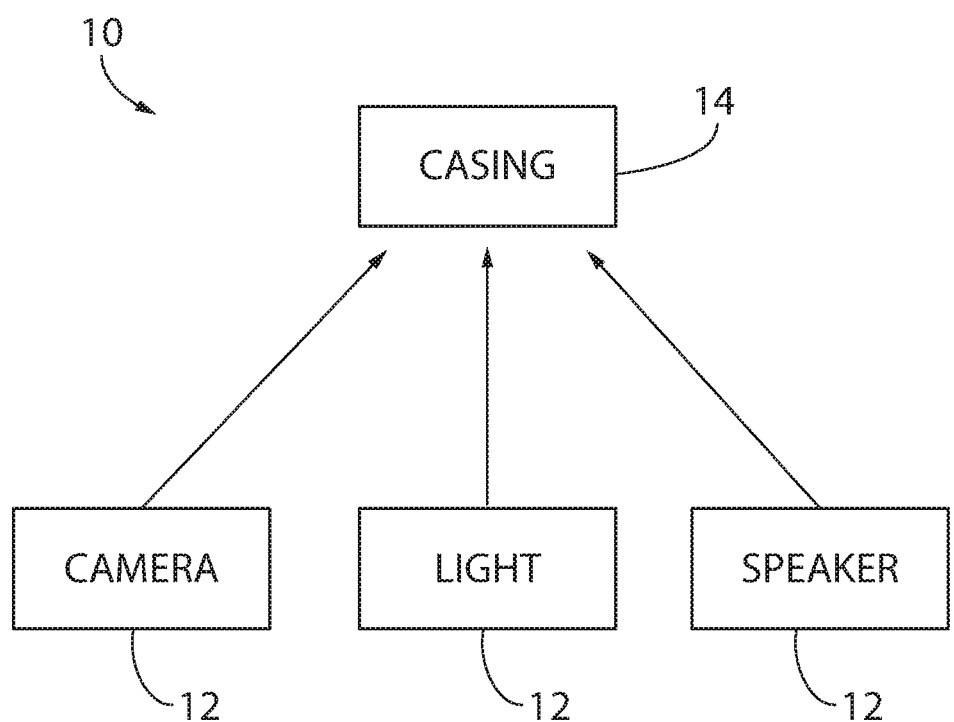

Referring generally now to FIGS. 6 and 8 and initially FIG. 6, the power connector 126 is shown in isolation. The power connector 126 includes a body 128 and an electrical cable 130 extending therefrom configured to provide electrical current. The body 128 is configured to be received within and engage the raised annular ridge 132 located at the bottom 22 of the casing 14. A platform 134 extends upwardly from the body 128 and is bordered by a resilient gasket 136 that forms a water tight seal with the bottom 22 of the casing 14 when in use. A magnet 138 is disposed within the upper surface 140 of the platform 134, which is configured to form a magnetic attachment with a magnet 142 of opposing polarity, located within a receiving port 139 at the bottom 22 of the casing 14. However, it should be understood that either magnet 138 or 142 may be substituted with a ferrous metal while maintaining the magnetic attachment between the power connector 126 and the casing 14. To avoid the power connector 126 from passively disengaging from the casing 14, for example under the force of gravity, in one embodiment of the present invention a force of approximately between 10 N and 22 N and more typically of 15.12 N is required to overcome the magnetic attachment between the power connector 126 and the casing 14.

Still referring to FIG. 8, the upper surface 140 of the platform 134 further contains an electrical contact assembly 144. In one embodiment of the current invention, the contact assembly 144 include three contacts that take the form spring loaded pogo pins arranged in a triangular configuration. In this configuration, the central pin 146 provides an identification signal configured to identify the given electronic device module 12 present in the modular system 10 at a given time, a first side pin 148 provides a power supply to the modular system 10, and an opposing second side pin 150 provides a ground for the circuit. As was described above, the pins 146, 148, 150 extend upwardly to form an electrical contact with exterior surfaces of contacts 124, when the power connector 126 is affixed to the receiving port 139 on the bottom 22 of the casing 14.

Additionally, a centrally located post 152 extends upwardly from the upper surface 140 of the platform 134 within the triangularly positioned exposed contacts of the contact assembly 144, and more preferably between the first and second side pins 148, 150. The post 152 has a height approximately equal to that of the exposed contacts 146, 148, and 150 and a width approximately three time larger than that of the exposed contacts. The post 152, along with the body 128 and platform 134 of the power connector 126, is formed of an electrical insulator or nonconductive material and is positioned between the triangularly configured pogo pin electrical connectors forming the contact assembly 144. In this position and configuration, the post 152 inhibits the occurrence of electricals arcing or circuit shorts from forming between the connectors of assembly 144 and in presence of moisture, for example, when the modular system 10 is used outdoors.

Referring now to FIG. 6, the power connector 126 is shown in magnetic attachment to the bottom 22 of the casing, thereby forming an electrical circuit that travels from the power connector 126, through the casing 14 and into the camera 16 (or alternative electronic device module 12). As shown in FIG. 6, magnetic attachment of the power connector 126 within the raised annular ridge 132 located at the bottom 22 of the casing 14 does not obstruct access to the module ejection button 98, which is located rearwardly of the body 128 of the power connector 126.

It is contemplated that an alternative embodiment may incorporate any of the features of the previous embodiment described above.

Many other changes and modifications could be made to the invention without departing from the spirit thereof.

What is claimed is:

1. A modular electronic device system for use with a wireless network, comprising:
    a casing having a plurality of contiguous walls, an interior void defined by inner surfaces of the walls, and a front opening providing access to the interior void;
    a wireless network connected electronic device module having an outer housing which is releasably received within the interior void of the casing, a battery located within a battery receiving void in the electronic device module, a front surface, and an electronic component located at the front surface of the electronic device module;
    an electrical pathway extending from a port at an outer surface of the casing to the electronic device module when the electronic device module is received within the interior void;
    a latch which, when engaged, retains the electronic device module in the void in the casing; and
    a module separation assembly having an activator that extends through a wall of the casing and that is selectively actuatable from outside the casing to disengage the latch and to permit removal of the wireless network connected electronic device module from the casing.

2. The modular electronic device system of claim 1, wherein the wireless network connected electronic device module is a camera.

3. The modular electronic device system of claim 1, wherein the outer housing of the wireless network connected electronic device module further comprises a body and a removable portion providing access to the battery receiving void disposed within the body.

4. The modular electronic device system of claim 1, wherein the module separation assembly comprises a first compression spring exerting a return force on the latch to retain the electronic device module within the casing in the absence of an applied force to the activator in a direction opposite the return force of the first compression spring.

5. The modular electronic device system of claim 4, wherein the module separation assembly comprises a second compression spring positioned generally perpendicular to the first compression spring, and wherein the second compression spring exerts a module separation force on an inner surface of the casing upon displacement of the latch.

6. The modular electronic device system of claim 4, wherein the activator comprises a push button and a resilient water tight seal extending between the push button and the wall of the casing.

7. The modular electronic device system of claim 1, wherein the port comprises a magnet configured to magnetically retain a power connector in electrical communication with the port.

8. The modular electronic device system of claim 7, wherein the port further comprises first, second and third electrical contacts disposed in a triangular configuration, the first electrical contact transmitting a wireless network connected electronic device module identification signal, the second electrical contact transmitting a power supply current to the wireless network connected electronic device module, and the third electrical contact providing a ground.

9. The modular electronic device system of claim 8, wherein the port further comprises a recess between the first, second, and third electrical contacts, the recess being configured to receive an electrical insulator post extending from the power connector.

10. The modular electronic device system of claim 1, wherein the opening of the casing defines a front of the casing, and wherein the casing further comprises a pair of spaced apart magnetic mount engaging locations disposed adjacent a rear of the casing that is generally opposite front of the casing.

11. The modular electronic device system of claim 1, wherein the opening of the casing defines a front of the casing, and wherein the casing further comprises an opposing rear wall having a threaded recess disposed about a longitudinal centerline of casing, the threaded recess being configured to mate with a mount having a threaded shaft.

12. A modular camera system for use with a wireless network, comprising:
    a casing having a plurality of contiguous walls, an interior void defined by inner surfaces of the walls, an opening at a front of the casing providing access to the interior void, and at least one mount engagement location disposed about a rear wall that is generally opposite the front of the casing;
    a wireless network connected camera module having an outer housing configured to be releasably received within the interior void of the casing, a front surface extending through the opening defined by the edge of the walls when the camera module is received within the interior void, and a lens that is disposed within the front surface of the camera module;
    an electrical pathway extending from a port at an outer surface of the casing to the camera module, when the camera module is received within the interior void; and
    a module separation assembly including a movable activator extending through a wall of the casing and being configured to selectively disengage a pivoting latch disposed within the camera module, wherein the pivoting latch is configured to retain the camera module in the casing in the absence of a displacement of the movable activator.

13. The modular camera system of claim 12, wherein the camera further comprises a plurality of LEDs configured to emit IR energy in the range of 700 nm to 1 mm forward of the front surface of the camera module and an IR sensitive image sensor that is disposed rearwardly of the lens and that is configured to generate imaging in low light conditions.

14. The modular camera system of claim 12, further comprising a power connector magnetically affixed to the port at an outer surface of the casing, wherein the power connector comprises first, second and third electrical contacts extending upwardly from a surface of power connector in a triangular configuration with an electrical insulator post centrally located within the triangular configuration.

15. The modular camera system of claim 14, wherein the activator of the module separation assembly is positioned adjacent the port at the outer surface of the casing and further comprises a push button and a resilient water tight seal extending between the push button and the wall of the casing.

16. The modular camera system of claim 14, wherein the push button is unobstructed by a body of the power connector when the power connector is magnetically affixed to the port at an outer surface of the casing.

17. The modular camera system of claim 12, wherein the module separation assembly comprises:
    a first compression spring within the camera module exerting a return force on the latch to retain the camera module within the casing in the absence of an applied force to the activator in a direction opposite the return force of the first compression spring; and
    a second compression spring positioned generally perpendicular to the first compression spring within camera module, wherein the second compression spring exerts a module separation force on an inner surface of the casing upon displacement of the latch.

18. The modular camera system of claim 12, wherein at least one mount engagement location is disposed about the rear wall of the casing and comprises a pair of spaced apart magnetic mount engaging locations that are configured to selectively and alternatively magnetically engage a mount device.

19. A method of separating modules from a modular electronic device system, the system including a casing having a plurality of contiguous walls, an interior void defined by inner surfaces of the walls, and an opening providing access to the interior void with a wireless network connected electronic device module retained within the inner void of the casing and forming an electrical pathway from the electronic device module to a port at an outer surface of a wall, the method comprising:
    exerting a pushing force on a push button extending through the wall of the casing, wherein the pushing force is translated to an outer surface of a pivot plate disposed within the surface of the electronic device module and is sufficient to overcome a return spring force exerted on the opposing inner surface of the pivot plate by a first compression spring;
    displacing the pivot plate in a direction of the pushing force to release a frictional engagement between the outer surface of the pivot plate and a catch extending inwardly from an inner surface of the wall;
    upon displacement of the pivot plate and release of the catch, exerting a module separation force on an inner surface of the casing that is generally opposite the opening with a second compression spring positioned generally perpendicular to the first compression spring; then
    separating the electronic device module from interior void of the casing.

20. The method of claim 19, wherein the electronic device module comprises one of a camera, a floodlight, and a speaker, and further comprising, following the separating step, replacing the one electronic device module with another electronic device module comprising another of a camera, a floodlight, and a speaker and retaining another electronic device module in the casing via engagement of the latch with another electronic device module.

\* \* \* \* \*